Figure 1:
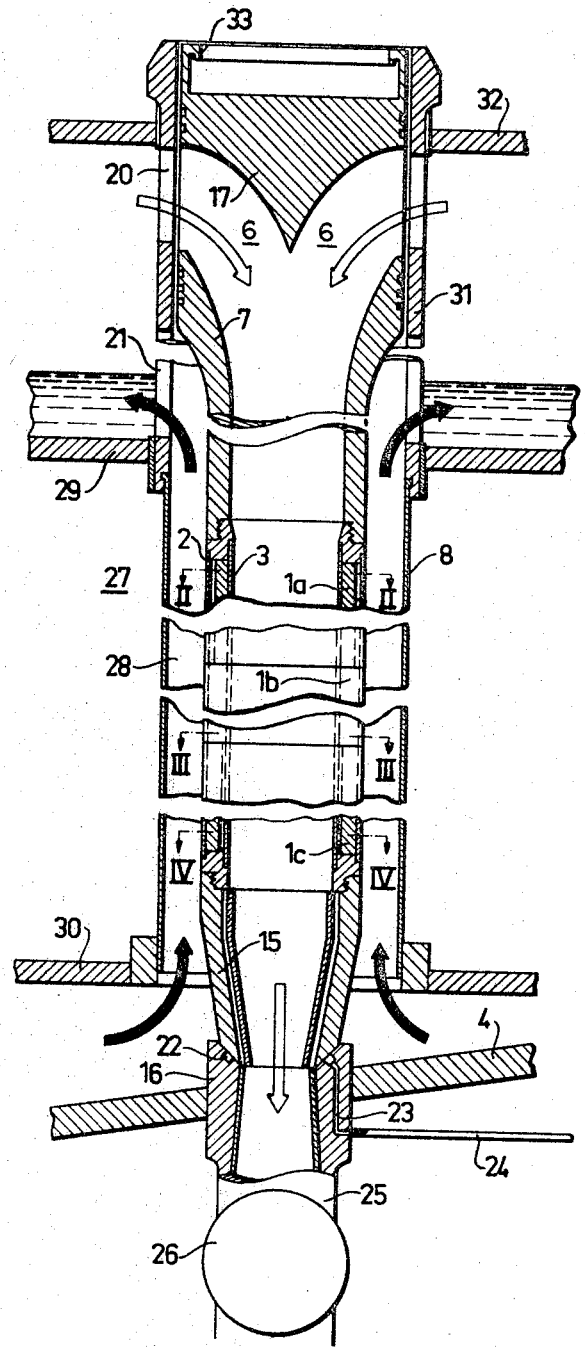

July 18, 1967

P. H. E. MARGEN 3,331,746

TUBULAR FUEL ELEMENT FOR A NUCLEAR REACTOR

Filed July 16, 1965

4 Sheets-Sheet 3

3,331,746
TUBULAR FUEL ELEMENT FOR A NUCLEAR REACTOR

Peter Heinrich Erwin Margen, Nasbypark, Sweden, assignor to Aktiebolaget Atomenergi, Stockholm, Sweden, a company of Sweden
Filed July 16, 1965, Ser. No. 472,424
Claims priority, application Sweden, July 24, 1964, 9,021/64; Dec. 7, 1964, 14,792/64
6 Claims. (Cl. 176—54)

The invention relates to a tubular fuel element for a nuclear reactor, the element comprising a body of fissile fuel having at least one surface cooled by boiling water and at least one surface cooled by steam. The invention particularly relates to a combined boiler and superheater element, the steam produced on one surface of the element being superheated on its other surface.

In a tubular fuel element of this type the water-cooled surface is usually more efficiently cooled than the steam-cooled surface. Consequently, the highest allowed energy of the element will usually be determined by the highest allowed temperature of the steam-cooled surface. The surfaces of the element are usually covered by a protective coating, usually consisting of a metal having a low absorption for neutrons, such as zirconium. Consequently, the highest energy of the element will usually be limited by the highest allowed temperature of the protective coating.

It has been found, according to the invention, that the highest allowed energy of the fuel element can be increased if a heat-insulating layer is provided on at least part of one of the cooled surfaces of the fuel element for directing the major part of the heat produced in the fissile fuel towards the other surface. The idea of the invention is that said heat-insulating layer shall direct the major part of the heat to the surface of the fuel body which is the most efficiently cooled, may it be the water-cooled or the steam-cooled surface. This makes it possible to increase the total energy produced in the fuel body.

The invention is of particular interest in vertical tubular fuel elements being cooled on their outer side by boiling water, the produced steam being passed downward through the tubular element while being superheated. In an element of this type the water-cooled side will produce the best cooling at the bottom of the element, whereas the steam-cooled side will produce the best cooling at the top of the element. According to the invention the top portion of such a fuel element shall be provided with a heat-insulating layer on the water-cooled surface, whereas the bottom portion shall be provided with a heat-insulating layer on the steam-cooled surface. Consequently, a larger percentage of the heat flux will leave the fuel element through the water-cooled surface at the bottom of the element than what is the case at the top of the element.

The invention can be utilized not only in a fissile fuel consisting of a metal, for instance uranium, but also in a fuel consisting of a ceramic material, such as uranium oxide.

The heat insulating layer may, for instance, consist of a layer of an oxide havinng a high melting point, being provided in a known way between the fissile fuel and the protective coating. Preferably, the heat insulating layer should consist of a gas-filled space between the fissile fuel and the protective coating. The gas-filled space should preferably consist of recessed portions, for instance grooves, on the surface of the fissile fuel.

Figure 2:
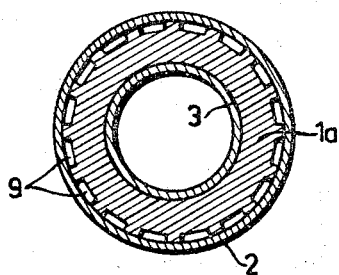
Figure 3:
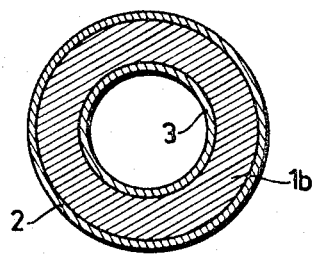
Figure 4:
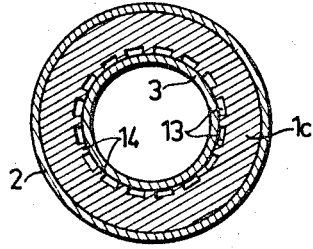
Figure 5:
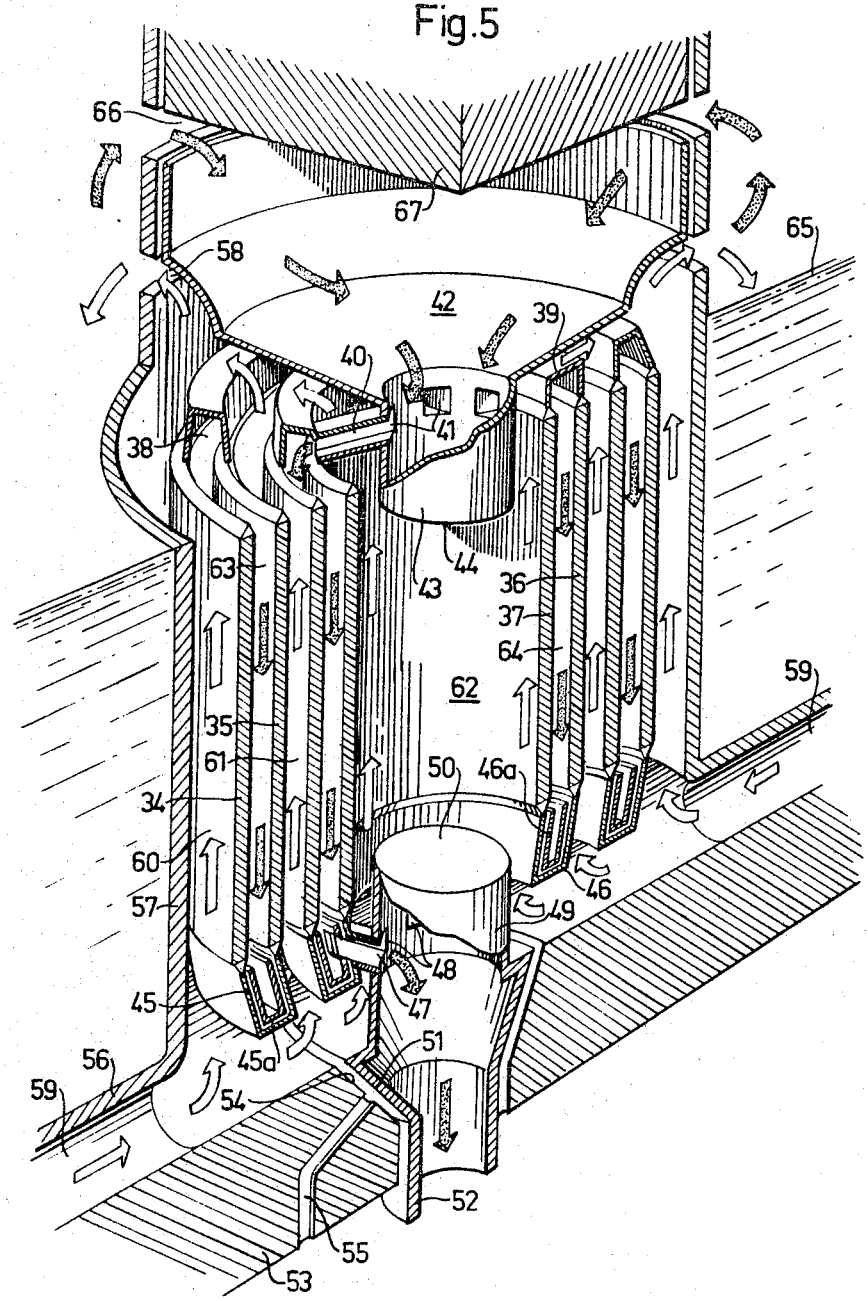
Figure 6:
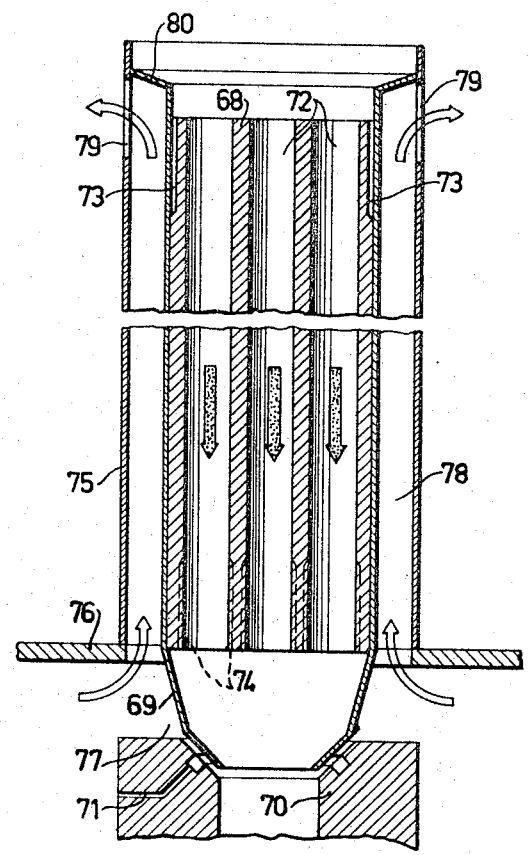
Figure 7:
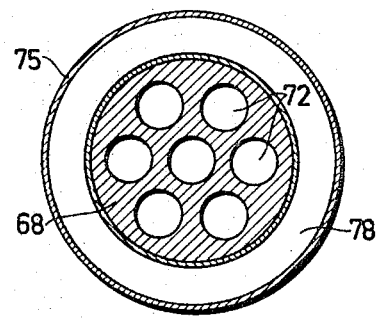

The invention will be described below with reference to the accompanying drawings which show three embodiments of a vertical combined boiler and superheater element according to the invention. FIG. 1 shows a vertical cross-section of a first embodiment of the element. FIGS. 2, 3 and 4 show on a larger scale cross-sections on the lines II—II, III—III and IV—IV in FIG. 1. FIG. 5 shows a second embodiment of the element. FIG. 6 shows a vertical cross-section of a third embodiment of the element. FIG. 7 shows a cross-section of the element of FIG. 6.

The fuel element according to FIGS. 1–4 consists of three tubular fuel bodies 1a, 1b and 1c having their surfaces covered with an outer protective coating 2 and an inner protective coating 3. The fuel element thus composed has a lower portion 15 supported on a seat 16 in the bottom 4 of the reactor core. The seat 16 contains a groove 22 communicating through a duct 23 and a pipe 24 with a supply of pressurized water, not illustrated. The seat 16 is fastened to a pipe 25 which can be closed by means of a valve 26. The top portion 1a of the fuel body is fastened to a hollow head 7, 17 containing canals 6 opening on its cylindrical outer wall. The top portion 17 of the head has a flange-like portion 33 which can be seized by a lifting tool when the fuel element is to be lifted out of the reactor. The head 7, 17 is slidable in a tube 31 having two series of openings in its wall, namely a series of lower openings 21 and a series of upper openings 20 registering with the openings of the canals 6 in the head. The tube 31 is mounted between two plates 29, 32, defining between them a space for steam and water.

The bottom of the tube 31 is fastened to the top of a tube 8 extending vertically so as to surround the main portion of the fuel element. The bottom of said tube 8 is fastened to a plate 30. The plates 29 and 30 define between them a space 27 for water acting as moderator.

The device described so far operates in this way. Feed water is supplied to the space between the plates 4 and 30. The water flows from said space into the space 28 between the tube 8 and the fuel element 1, flowing upward through said space while boiling. The mixture of steam and water flows out through the openings 21. The steam flows through the openings 20 and the canals 6 and down through the fuel element 1 while being superheated. When the fuel element is to be changed the valve 26 is closed, and pressurized water is supplied through the pipe 24, resulting in the fuel element being lifted from the seat 16. The fuel element is now lifted up from the tube 8 by a lifting tool in a known way, and a new fuel element is inserted.

The outer surface of the tubular fuel body 1a has vertical grooves 9 (see FIG. 2) which are gas-filled, consequently forming heat-insulating spaces between the surface of the fissile fuel and the protective coating 2. The inner surface of the fuel body 1c has vertical gas-filled grooves 13 (see FIG. 4), separated by narrow portions 14 which are in contact with the protective coating 3.

As a result of the heat insulating grooves 13 on the lower portion 1c of the fuel body, a comparatively large part of the heat produced in the fuel body 1c will be directed outwardly to heat the water in the boiler space 28, whereas a comparatively small part of said heat will be utilized for superheating the steam. In the middle portion of the fuel element a comparatively smaller part of the heat produced in the fuel body 1b will be directed outwardly for heating the water. In the upper portion of the fuel element a still lower part of the heat produced in the fuel body 1a will be directed outwardly for heating the water, whereas a comparatively large part of said heat will be utilized for superheating the steam. This is consistent with the natural cooling capacity, as the water has its highest cooling capacity at the bottom of the fuel element, whereas the steam has its highest cooling capacity at the top of the fuel element.

FIG. 5 illustrates a fuel element containing four coaxial tubes 34–37 of fissile fuel. The tops of the tubes 34 and 35 are interconnected by means of an annular wall member 38. A similar annular wall member 39 interconnects the tops of the tubes 36 and 37. In a similar way the bottoms of said tubes are interconnected by pairs by means of annular wall members comprising outer walls 45, 46 and inner walls 45a, 46a. A cover 42 is situated above the fuel tubes, said cover having a central cylindrical portion 43, 44 having openings 41 in its wall. Ducts 40 extend radially from the openings 41 to the annular wall members 38, 39 so as to produce a communication between the central cavity 43, 44 and the annular spaces 63 and 64 between the fuel tubes 34, 35 and 36, 37, respectively.

The bottom portion of the fuel element also contains a central cavity defined by a cylindrical wall 49 and a cover 50. The wall 49 contains openings 48. Ducts 47 extend radially to interconnect the openings 48 and the annular wall members 45, 46, thus producing a communication between the central cavity 49, 50 and the annular spaces 63 and 64.

The cylindrical wall 49 is fastened to an outlet tube 52 having a conical portion 51 supported on a conical seat 54 in a plate 53. The lifting of the fuel element from the plate 53 is facilitated by supplying pressurized water to the seat 54 through a conduit 55.

The fuel element is situated within a vertical tube 57 having its lower end secured to a plate 56 and its upper end closed by a plug 67. The tube 57 and the plate 56 define a space 65 for water acting as moderator. The upper portion of the tube 57 has two series of openings 58 and 66.

In operation feed water is supplied through the ducts 59 defined between the plates 53 and 56. The water flows upward through the spaces 60, 61 and 62 while being brought to boil. The mixture of steam and water flows through the openings 58. The steam flows through the openings 66 and 41 and through the ducts 40, enters the spaces 63 and 64, and flows downward through said spaces while being superheated. The superheated steam reaches the lower annular wall members 45, 46 where the improved heat-insulation produced by the auxiliary walls 45a, 46a, prevents the steam from condensating, and leaves the fuel element through the ducts 49, the openings 48 and the outlet tube 52.

The fuel element of FIG. 5 is designed to be operated under such conditions that the water and the steam-water-mixture has a higher cooling capacity than the steam being superheated. Consequently, the steam-cooled surfaces of the fuel tubes, that is the surfaces defining the annular spaces 63 and 64, are provided with a heat-insulating layer according to the invention, whereas the water-cooled surfaces, that is the surfaces facing the spaces 60, 61 and 62, merely have a protective coating of zirconium, for instance, allowing a good heat transmission from the nuclear fuel to the water.

The fuel element disclosed in FIGS. 6 and 7 contains a cylindrical body 68 of fissile fuel containing seven passageways 72 extending lengthwise through the fuel body. All surfaces of the fissile fuel are covered with a protective coating of zirconium, for instance. The upper portion of the outer cylindrical surface of the fuel body has a heat-insulating layer 73 according to the invention, viz. grooves providing a plurality of heat insulating spaces between the fissile fuel and the protective coating. The lower portions of the walls of the channels 72 have a similar heat-insulating layer 74. The bottom of the fuel body 68 is fastened to a tubular member 69 which is supported on a seat in a plate 70. Pressurized water can be supplied to the seat through a duct 71, so as to facilitate the lifting of the fuel element. The top of the fuel body 68 supports a flange-like member 80 which is slidable on the inner wall of a flow tube 75. The bottom of the flow tube 75 is fastened to a plate 76, and the top portion of the flow tube has a series of openings 79.

In operation water flows from the space 77 upward through the annular space 78 between the fuel element and the flow tube. The mixture of steam and water thus produced leaves the flow tube 75 through the openings 79. The steam flows down through the channels 72 while being superheated, and the superheated steam leaves the fuel element through the tubular member 69 and the opening in the plate 70.

What is claimed is:
1. In a nuclear reactor comprising a nuclear fuel element containing at least one water coolant channel and at least one steam coolant channel, a nuclear fuel body between said coolant channels, means for passing water through said water coolant channel in such heat exchanging relationship with the nuclear fuel body as to produce steam, and means for passing said steam through said steam coolant channel in such heat exchanging relationship with the nuclear fuel body as to produce superheated steam, the improvement which consists in providing a heat-insulating layer on at least part of a surface of the side of the nuclear fuel body defining a coolant channel in which the coolant has a lower cooling capacity, so as to direct a major part of the heat which is produced in said nuclear fuel body behind said part of said surface towards a coolant channel in which the coolant has a higher cooling capacity.

2. A fuel element as claimed in claim 1, in which the body of fissile fuel is tubular and is water-cooled on one side and steam-cooled on the other side.

3. A fuel element as claimed in claim 1, in which the body of fissile fuel consists of a cylinder having its peripheral surface water-cooled and having a plurality of steam-cooled channels parallel to its axis.

4. A fuel element as claimed in claim 1, in which the heat-insulating layer is arranged between the surface of the fissile fuel and a protective coating.

5. A fuel element as claimed in claim 4, in which the heat-insulating layer consists of a gas-filled space between the surface of the fissile fuel and a protective coating on said surface.

6. In a nuclear reactor comprising a nuclear fuel element containing at least one vertical water coolant channel and at least one vertical steam coolant channel, a nuclear fuel body between said coolant channels, means for passing water upwardly through said water coolant channel in such heat exchanging relationship with the nuclear fuel body as to produce steam, and means for passing said steam downwardly through said steam coolant channel in such heat exchanging relationship with the nuclear fuel body as to produce superheated steam, the improvement which consists in providing a heat-insulating layer on at least part of the surface of said nuclear fuel body defining said water coolant channel so as to direct the major part of the heat produced in said nuclear fuel body behind said part of said surface towards the steam coolant channel, said heat-insulating, layer being so arranged as to provide the best heat insulation in the upper portion of said water coolant channel where the water has its lowest cooling capacity, and that a heat-insulating layer is provided on at least part of the surface of said nuclear fuel body defining said steam coolant channel so as to direct the major part of the heat produced in said nuclear fuel body behind said part of the surface towards the water coolant channel, said heat-insulating layer being so arranged as to provide the best heat insulation in the lower portion of said steam coolant channel where the steam has its lowest cooling capacity.

(References on following page)

References Cited

UNITED STATES PATENTS

| | | | |
|---|---|---|---|
| 2,999,059 | 9/1961 | Treshow | 176—54 X |
| 3,034,977 | 5/1962 | Holl et al. | 176—83 X |
| 3,072,555 | 1/1963 | Barth et al. | 176—83 X |
| 3,121,666 | 2/1964 | Wheelock | 176—61 X |
| 3,178,358 | 4/1965 | Soderholm | 176—54 |
| 3,188,277 | 6/1965 | Kornbichler et al. | 176—54 X |

FOREIGN PATENTS 798,282  7/1958  Great Britain.

CARL D. QUARFORTH, *Primary Examiner.*

BENJAMIN R. PADGETT, *Examiner.*

M. J. SCOLNICK, *Assistant Examiner.*